United States Patent
Chebolu et al.

(10) Patent No.: US 11,164,385 B2
(45) Date of Patent: Nov. 2, 2021

(54) APPARATUSES AND METHODS FOR ESTABLISHING VIRTUAL REALITY (VR) CALL BETWEEN CALLER VR DEVICE AND CALLEE VR DEVICE

(71) Applicant: Samsung Electronics Co., Ltd., Suwon-si (KR)

(72) Inventors: Praveen Chebolu, Bangalore (IN); Varun Bharadwaj Santhebenur Vasudevamurthy, Bangalore (IN); Srinivas Chinthalapudi, Bangalore (IN); Tushar Vrind, Bangalore (IN); Abhishek Bhan, Bangalore (IN); Nila Rajan, Bangalore (IN)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/672,842

(22) Filed: Nov. 4, 2019

(65) Prior Publication Data
US 2021/0049821 A1 Feb. 18, 2021

(30) Foreign Application Priority Data
Aug. 17, 2019 (IN) .............................. 201941033239

(51) Int. Cl.
| | | |
|---|---|---|
| G06T 19/00 | (2011.01) | |
| G06F 3/01 | (2006.01) | |
| H04M 3/436 | (2006.01) | |
| H04N 21/235 | (2011.01) | |
| G02B 27/01 | (2006.01) | |
| H04N 13/344 | (2018.01) | |
| H04L 29/06 | (2006.01) | |
| G06F 3/0481 | (2013.01) | |

(52) U.S. Cl.
CPC .......... G06T 19/006 (2013.01); G02B 27/017 (2013.01); G06F 3/011 (2013.01);
(Continued)

(58) Field of Classification Search
None
See application file for complete search history.

(56) References Cited

U.S. PATENT DOCUMENTS

| | | | |
|---|---|---|---|
| 8,699,517 B2 | 4/2014 | Hong et al. | |
| 2004/0228291 A1* | 11/2004 | Huslak | H04N 7/152 370/260 |

(Continued)

FOREIGN PATENT DOCUMENTS

| | | |
|---|---|---|
| CN | 205902096 U | 1/2017 |
| KR | 10-2013-004964 A | 1/2013 |
| WO | WO-2018/040650 A1 | 3/2018 |

OTHER PUBLICATIONS

"Summit Tech Launches IMS 360° Virtual Reality RCS Calling at MWC", Feb. 22, 2016, (https://www.realwire.com/releases/Summit-Tech-Launches-IMS-360-Virtual-Reality-RCS-Calling-at-MWC).

(Continued)

*Primary Examiner* — Nicholas R Wilson
(74) *Attorney, Agent, or Firm* — Harness, Dickey & Pierce, P.L.C.

(57) ABSTRACT

A method for establishing a virtual reality (VR) call between a caller VR device and a callee VR device, the method includes determining which of the caller VR device or the callee VR device should perform a stitching operation associated with the VR call based on a first plurality of parameters associated with the callee VR device and a second plurality of parameters associated with the caller VR device, and causing transmission of one of a plurality of media contents or a stitched media content from the caller VR device to the callee VR device after establishment of the VR call based on the determining.

19 Claims, 6 Drawing Sheets

(52) U.S. Cl.
CPC ...... *G06F 3/04815* (2013.01); *H04L 65/1006* (2013.01); *H04L 65/608* (2013.01); *H04L 67/38* (2013.01); *H04M 3/4365* (2013.01); *H04N 13/344* (2018.05); *H04N 21/2353* (2013.01); *G02B 2027/014* (2013.01)

(56) References Cited

U.S. PATENT DOCUMENTS

2009/0298587 A1* 12/2009 Acharya ............ H04L 65/4038 463/35
2016/0381398 A1   12/2016 Saxena et al.
2018/0192081 A1*  7/2018 Huang ................... G06T 15/20
2019/0102941 A1*  4/2019 Khan .................... H04N 13/366

OTHER PUBLICATIONS

Frederic Gabin et al., "5G Multimedia Standardization", Journal of ICT Standardization, vol. 6, pp. 117-136, May 2018.

Rebecca Hills-Duty, "Summit Tech Demonstrate VR Video Calls at MWC 2018-Enhanced Vr Video calls featuring real-time chat will be demonstrated using live music performances", Feb. 27, 2018 (https://www.vrfocus.com/2018/02/summit-tech-demonstrate-vr-video-calls-at-mwc-2018/).

* cited by examiner

FIG. 4
FIG. 5
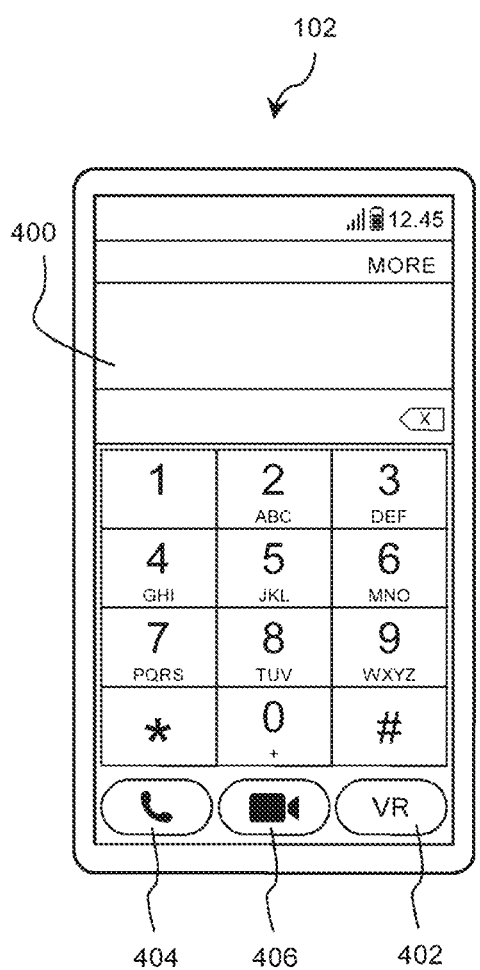
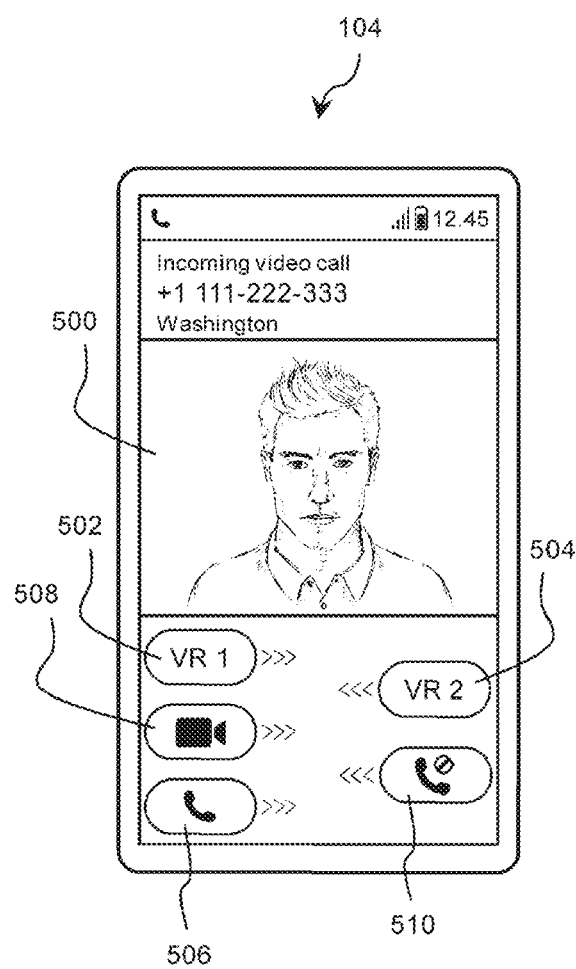

APPARATUSES AND METHODS FOR ESTABLISHING VIRTUAL REALITY (VR) CALL BETWEEN CALLER VR DEVICE AND CALLEE VR DEVICE

RELATED APPLICATION

This application claims priority to and the benefit of Indian Patent Application No. 201941033239 filed in the Indian Patent Office on Aug. 17, 2019, the entire contents of which are incorporated herein by reference.

FIELD

The present disclosure generally relates to virtual reality (VR) devices, and more particularly, to methods and apparatuses for establishing VR calls between caller VR devices and callee VR devices.

BACKGROUND

Virtual reality (VR) content stitching is the process of combining multiple overlapping media contents such as images and video to create a single 360-degree media content such as 360-degree image and 360-degree video. However, the VR content stitching presently available on mobile devices such as smart phones and laptops consumes lot of power.

Further, present mobile devices are capable of live streaming VR calls. Such a capability is available via either specific applications or external 360-degree cameras coupled with the mobile devices. However, during such live streaming VR calls, a 360-degree effect is achievable either through sharing complete data covering all angles with a receiver; or through an external server sending views corresponding to desired angles based on a receiver's request. This leads to higher consumption of power and bandwidth.

Thus, it would be desirable to provide a solution to overcome above-mentioned deficiencies.

SUMMARY

This summary is provided to introduce a selection of concepts in a simplified format that are further described in the detailed description of the present disclosure. This summary is not intended to identify key or essential inventive concepts of the claimed subject matter, nor is it intended for determining the scope of the claimed subject matter. In accordance with the purposes of the disclosure, the present disclosure as embodied and broadly described herein, describes methods and apparatuses for establishing a virtual reality (VR) call between a caller VR device and a callee VR device.

In accordance with some example embodiments of the inventive concepts, a method for establishing a VR call between a caller VR device and a callee VR device is disclosed. The method includes determining which of the caller VR device or the callee VR device should perform a stitching operation associated with the VR call based on a first plurality of parameters associated with the callee VR device and a second plurality of parameters associated with the caller VR device, and causing transmission of one of a plurality of media contents or a stitched media content from the caller VR device to the callee VR device after establishment of the VR call based on the determining.

In accordance with some example embodiments of the inventive concepts, an apparatus for establishing a VR call between a caller VR device and a callee VR device is disclosed. The apparatus includes at least one processor configured to execute computer readable instructions to determine which of the caller VR device and the callee VR device should perform a stitching operation associated with the VR call based on a first plurality of parameters associated with the callee VR device and a second plurality of parameters associated with the caller VR device, cause transmission of one of a plurality of media contents or a stitched media content from the caller VR device to the callee VR device after establishment of the VR call based on the determination.

Some advantages of the present disclosure include, but not limited to, enabling offloading of the stitching process based on a capability discovery process prior to establishing a VR call. This enables optimizing or improving performance of resource(s) used for rendering the VR call. This leads to enhanced user-experience.

These aspects and advantages will be more clearly understood from the following detailed description taken in conjunction with the accompanying drawings and claims.

BRIEF DESCRIPTION OF THE DRAWINGS

These and other features, aspects, and/or advantages of the present disclosure will become better understood when the following detailed description is read with reference to the accompanying drawings in which like characters represent like parts throughout the drawings, wherein:

FIG. 4 illustrates an example user interface provided by the caller VR device for establishing the VR call, in accordance with some example embodiments of the inventive concepts.

FIG. 5 illustrates an example user interface provided by the callee VR device for establishing the VR call, in accordance with some example embodiments of the inventive concepts.

Figure 1:
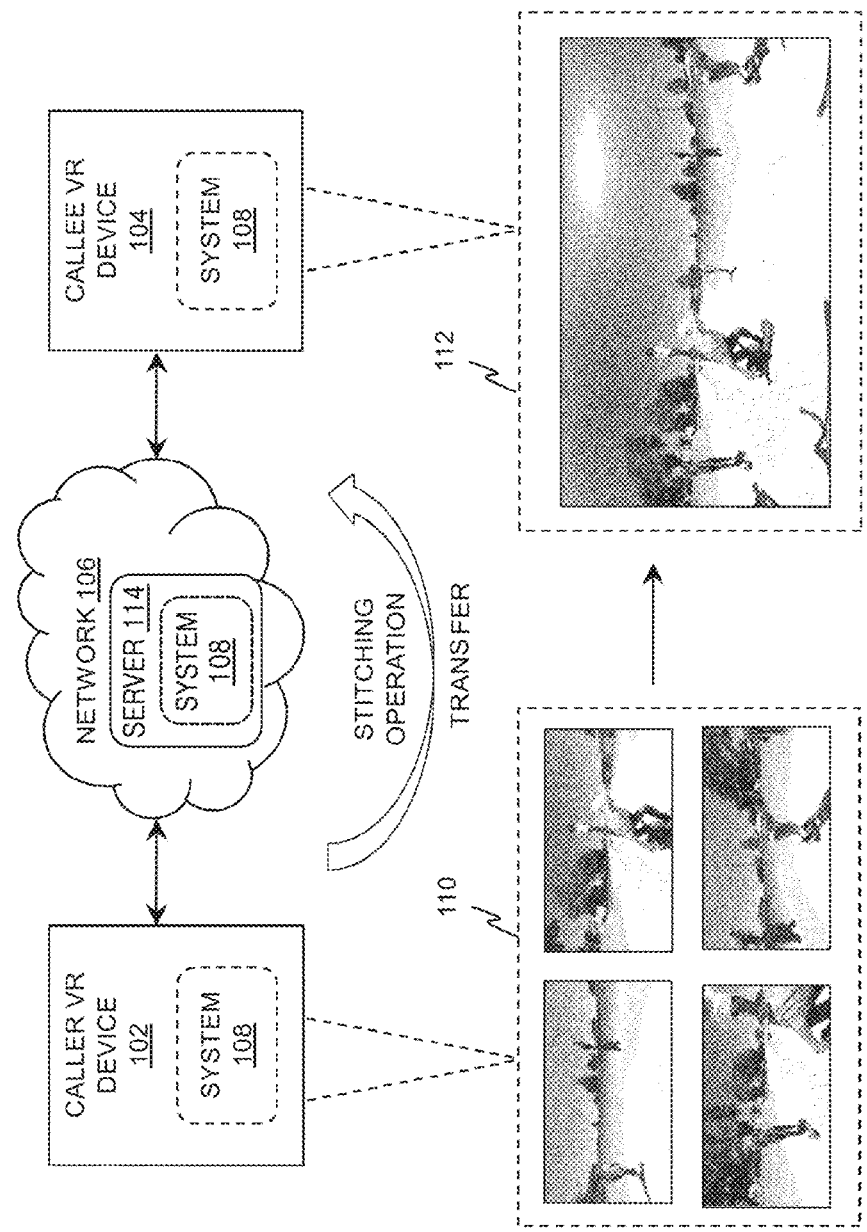
FIG. 1 illustrates an example network environment depicting interaction between a caller virtual reality (VR) device and a callee VR device to establish a VR call between the caller VR device and the callee VR device, in accordance with some example embodiments of the inventive concepts.

Further, skilled artisans will appreciate that elements in the drawings are illustrated for simplicity and may not have been necessarily been drawn to scale. For example, the flow charts illustrate the method in terms of some operations involved to help to improve understanding of aspects of the present disclosure. Furthermore, in terms of the construction of the device, one or more components of the device may have been represented in the drawings by conventional symbols, and the drawings may show some specific details that are pertinent to understanding some example embodiments of the inventive concepts so as not to obscure the drawings with details that will be readily apparent to those of ordinary skill in the art having benefit of the description herein.

DETAILED DESCRIPTION

For the purpose of promoting an understanding of the principles of the disclosure, reference will now be made to some example embodiments illustrated in the drawings and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates. Unless otherwise defined, all technical and scientific terms used herein have the same meaning as commonly understood by one of ordinary skilled in the art to which this disclosure belongs. The system, methods, and examples provided herein are illustrative only and not intended to be limiting. Embodiments of the present disclosure will be described below in detail with reference to the accompanying drawings.

FIG. 1 illustrates example a network environment 100 depicting interaction between a caller virtual reality (VR) device 102, a server 114 of a network 106, and/or a callee VR device 104 to establish a VR call, in accordance with some example embodiments of the of the inventive concepts. The caller VR device 102 may be communicatively coupled with the callee VR device 104 over the network 106 to establish the VR call using an IP Multimedia Subsystem (IMS). The network 106 may be a wired network and/or a wireless network. Examples of the network 106 include, but not limited to, a cloud based network, a Wi-Fi® network, a WiMAX® network, and/or a Wireless Local Area Network (WLAN).

The caller VR device 102 may be an electronic device having VR capabilities and capable of initiating and/or placing a voice call and/or video call over a public switched telephone network, cellular network and/or the network 106 in addition to the VR call. As such, the VR call may be termed a mobile-originating (MO) call. In one example, the caller VR device 102 may be a standalone VR device such as a VR enabled smartphone. In another example, the caller VR device 102 may comprise a smartphone mounted in a head mounted device (HMD). In another example, the caller VR device 102 may comprise a smartphone communicatively coupled with specialized camera such as a 360-degree camera, stereoscopic camera, depth camera, etc. Similarly, the callee VR device 104 may be an electronic device having VR capabilities and capable of receiving a voice call and/or video call placed over a public switched telephone network, cellular network and/or the network 106 in addition to the VR call. As such, the VR call may be termed a mobile-terminating (MT) call. In one example, the callee VR device 104 may be a standalone VR device such as a VR enabled smartphone. In another example, the callee VR device 104 may comprise a smartphone mounted in a head mounted device (HMD). In another example, the callee VR device 104 may comprise a smartphone communicatively coupled with specialized camera such as a 3D camera, 360-degree camera, stereoscopic camera, depth camera, etc.

In accordance with some example embodiments, the first network environment 100 includes a system 108 for establishing the VR call between the caller VR device 102 and the callee VR device 104. The system 108 may be implemented in at least one of the caller VR device 102, the callee VR device, and/or in the server 114 (therefore illustrated with dashed lines). The system 108 may detect a placement of the VR call from the caller VR device 102 to the callee VR device 104. The system 108 may analyze data pertaining to a plurality of parameters associated with the caller VR device 102 and/or the callee VR device 104, to determine a capability to perform a stitching operation associated with the VR call by at least one of the caller VR device 102 and/or the callee VR device 104 (e.g., the system 108 may determine whether at least one of the caller VR device 102 and/or the callee VR device 104 is capable of performing the stitching operation). The system 108 may transfer the stitching operation associated with the VR call to one of the caller VR device and/or the callee VR device based on the analysis of first data and/or second data (e.g., the system 108 may cause the one of the caller VR device 102 and/or the callee VR device 104 to perform the stitching operation, and/or determine which one of the caller VR device 102 and/or the callee VR device 104 will and/or should perform the stitching operation based on the analysis of the first data and/or the second data). The system 108 may then establish the VR call between the caller VR device and the callee VR device 104. The system 108 may then enable (e.g., cause) transmission of one of plurality of media contents and/or stitched media content from the caller VR device 102 to the callee VR device 104 upon (e.g., after) establishment of the VR call based on the transferred stitching operation (e.g., based on the determination of which of the caller VR device 102 and/or the callee VR device 104 should perform the stitching operation).

In an example as illustrated in FIG. 1, the stitching operation may be transferred to the callee VR device 104, represented by the directional arrow. The caller VR device 102 may capture and/or transmit a plurality of media contents 110 to the callee VR device 104 upon establishment of the VR call. The callee VR device 104 may stitch the plurality of media contents 110 to form stitched media content 112 for rendering during the VR call. The media contents 110 may be any of 2D media contents and/or 3D media contents such as images and/or videos. The stitched media content 112 may be any of 180-degree media content, 360-degree media content, and/or 3D panoramic media content. The stitching operation may include converting 2D media contents to 3D panoramic media content; and/or stitching media contents into 180-degree media content and/or 360-degree media content.

Figure 2:
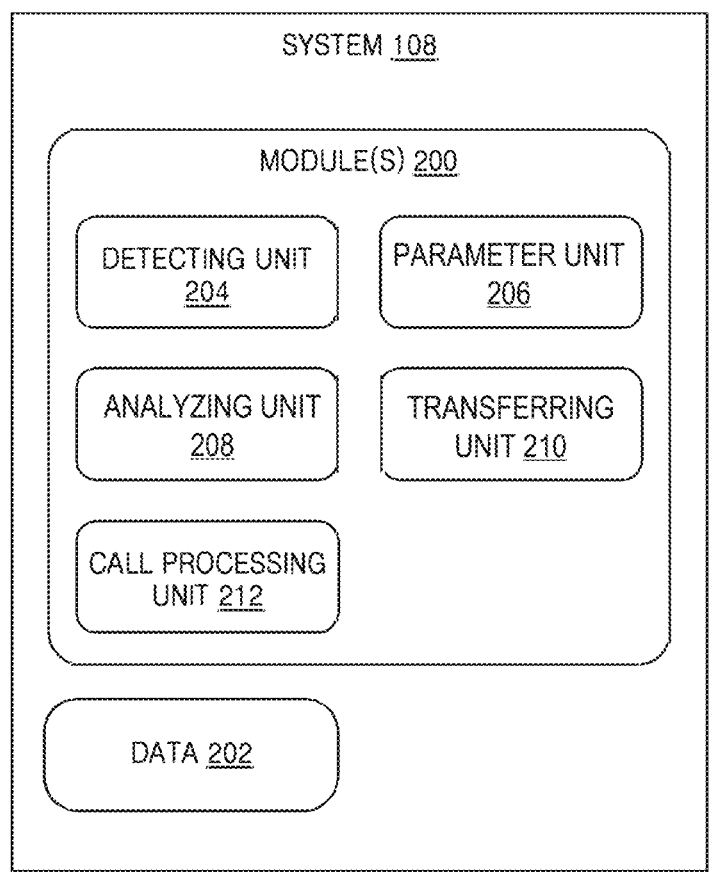
FIG. 2 illustrates a schematic block diagram of a system for establishing the VR call between the caller VR device and the callee VR device, in accordance with some example embodiments of the inventive concepts.
Figure 3:
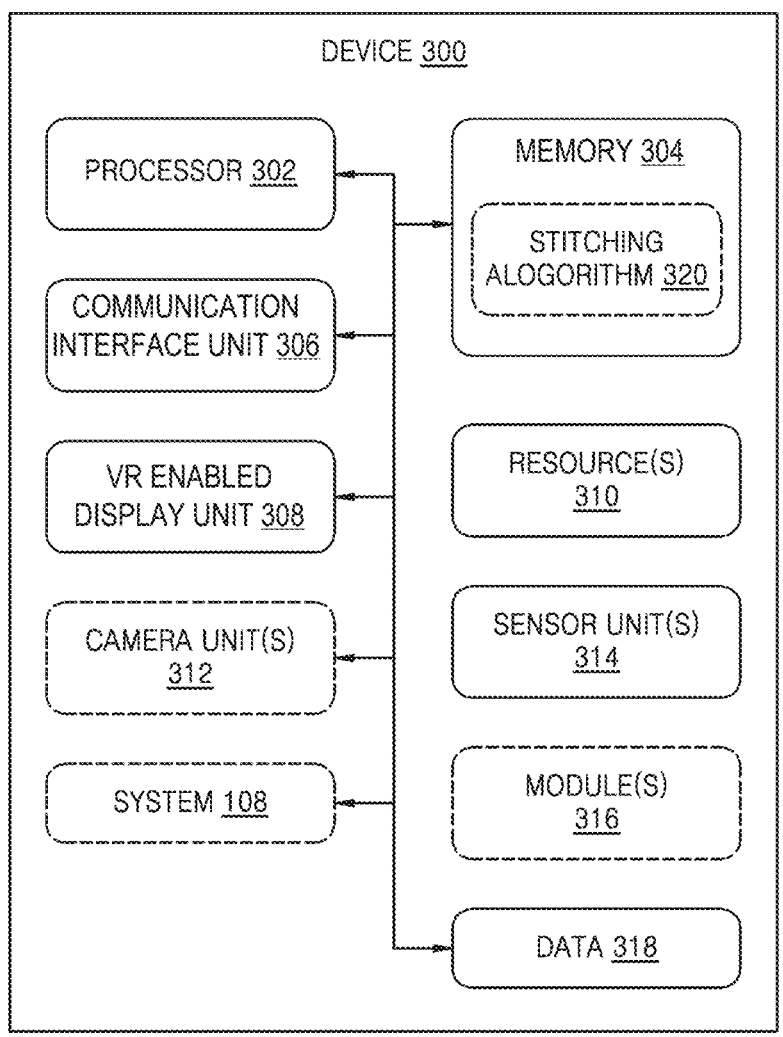
FIG. 3 illustrates a schematic block diagram of a device comprising the system, as illustrated in FIG. 2, for establishing the VR call, in accordance with some example embodiments of the inventive concepts.

Constructional and operational details of the system 108, and the caller VR device 102 the callee VR device 104 are explained in more detail in the description of FIG. 2 and FIG. 3.

FIG. 2 illustrates a schematic block diagram of the system 108 for establishing the VR call between the caller VR device 102 and the callee VR device 104, in accordance with some example embodiments of the inventive concepts. The system 108 may include module(s)/unit(s) 200 and/or data 202. The data 202 may serve, amongst other things, as a repository for storing data processed, received, and/or generated by the module(s) 200.

The module(s) 200, amongst other things, may include routines, programs, objects, components, data structures, etc., which perform particular tasks or implement data types. The module(s) 200 may also be implemented as, signal processor(s), state machine(s), logic circuitries, and/or any other device or component that manipulate signals based on operational instructions.

Further, the module(s) 200 may be implemented in hardware, instructions executed by at least one processing unit, or by a combination thereof. The processing unit may comprise a computer, a processor, a state machine, a logic array and/or any other suitable devices capable of processing instructions. The processing unit may be a general-purpose processor which executes instructions to cause the general-purpose processor to perform operations or, the processing unit may be dedicated to perform the required functions. In some example embodiments, the module(s) 200 may be machine-readable instructions (software) which, when executed by a processor/processing unit, perform any of the described functionalities.

In an embodiment, the module(s) 200 may include a detecting unit 204, a parameter unit 206, an analyzing unit 208, a transferring unit 210, and/or a call processing unit 212. The detecting unit 204, the parameter unit 206, the analyzing unit 208, the transferring unit 210, and/or the call processing unit 212 may be in communication with each other.

FIG. 3 illustrates a schematic block diagram of a device 300 for establishing the VR call, in accordance with some example embodiments of the inventive concepts. The device 300 may be any or all of the caller VR device 102, the callee VR device 104, and/or the server 114. For the sake of brevity, features of the present disclosure explained in detail in the description of FIGS. 1 and 2 are not explained in detail in the description of FIG. 3 and therefore, the description of FIG. 3 should be read in conjunction with the description of FIGS. 1 and 2 for better understanding.

The device 300 may include at least one processor 302 (also referred to herein as "the processor 302"), a memory 304, a communication interface unit 306, a VR enabled display unit 308, a resource(s) 310, a camera unit(s) 312, a sensor unit(s) 314, a module(s) 316, data 318, and/or the system 108. The processor 302, the memory 304, the communication interface unit 306, the VR enabled display unit 308, the resource(s) 310, the sensor unit(s) 314, the module(s) 316 and/or the system 108 may be communicatively coupled with each other via a bus. The device 300 may also include one or more input devices (not shown in the figure) such as a microphone, a stylus, a number pad, a keyboard, a cursor control device, such as a mouse, and/or a joystick, etc., and/or any other device operative to interact with the device 300. The device 300 may also include one or more output devices (not shown in the figure) such as speakers, etc. Further, the data 318 may serve, amongst other things, as a repository for storing data processed, received, and/or generated (e.g., by the module(s) 316).

The processor 302 may be a single processing unit or a number of units, all of which could include multiple computing units. The processor 302 may be implemented as one or more microprocessors, microcomputers, microcontrollers, digital signal processors, central processing units, processor cores, multi-core processors, multiprocessors, state machines, logic circuitries, application-specific integrated circuits, field programmable gate arrays and/or any devices that manipulate signals based on operational instructions. Among other capabilities, the processor 302 may be configured to fetch and/or execute computer-readable instructions and/or data (e.g., the data 318) stored in the memory 304.

The memory 304 may include any non-transitory computer-readable medium known in the art including, for example, volatile memory, such as static random access memory (SRAM) and/or dynamic random access memory (DRAM), and/or non-volatile memory, such as read-only memory (ROM), erasable programmable ROM (EPROM), flash memory, hard disks, optical disks, and/or magnetic tapes. In an embodiment, the device 300 may be the caller VR device 102. The memory 304 may store a stitching algorithm/solution 320 to perform (e.g., for use in performing) stitching of media contents. The stitching algorithm 320 may be stored by a manufacturer of the caller VR device 102 and/or may be downloaded onto the caller VR device 102 using techniques as known in the art.

In an embodiment, the device 300 may be the callee VR device 104. The memory 304 may or may not store a stitching algorithm/solution 320 to perform stitching of media contents. When the memory 304 stores the stitching algorithm 320, the stitching algorithm 320 may be stored by a manufacturer of the callee VR device 104 and/or may be downloaded onto the callee VR device 104 using techniques as known in the art.

In an embodiment, the device 300 may be the server 114. The memory 304 may not store the stitching algorithm 320. However, at least one of the caller VR device 102 and/or the callee VR device 104 may store the stitching algorithm 320 in accordance with some example embodiments of the inventive concepts.

The communication interface unit 306 may enable (e.g., facilitate) communication by the device 300 (for e.g., the caller VR device 102) with other electronic device(s) (for e.g., the callee VR device 104). The VR enabled display unit 308 may display various types of information (for example, media contents, multimedia data, text data, etc.) to a user of the device 300. The VR enabled display unit 308 may include, but is not limited to, a liquid crystal display (LCD), a light emitting diode (LED) display, an organic LED (OLED) display, a plasma cell display, an electronic ink array display, an electronic paper display, a flexible LCD, a flexible electro-chromic display, and/or a flexible electro wetting display.

The resource(s) 310 may be physical and/or virtual components of the device 300 that provide inherent capabilities and/or contribute towards the performance of the device 300. Examples of the resource(s) 310 may include, but are not limited to, memory (e.g., the memory 304), power unit (e.g. a battery), display unit (e.g., the VR enabled display unit 308), etc. The resource(s) 310 may include a power unit/battery unit, a network unit (e.g., the communication interface unit 306), etc., in addition to the processor 302, the memory 304, and the VR enabled display unit 308.

In an embodiment, the device 300 may be the caller VR device 102. In an embodiment, the device 300 may be the callee VR device 104. The camera unit(s) 312 may be an integral part of the device 300 or may be externally connected with the device 300 (therefore illustrated with dashed lines). Examples of the camera unit(s) 312 include, but are not limited to, a 3D camera, a 360-degree camera, a stereoscopic camera, a depth camera, etc. The device 300 may be the server 114. The device 300 may not include the camera unit(s) 312.

The sensor unit(s) 314 may comprise an eye-tracing sensor, a facial expression sensor, an accelerometer, a gyroscope, a location sensor, a gesture sensor, a grip sensor, a biometric sensor, an audio module, location/position detection sensor, etc.

The module(s) 316, amongst other things, include routines, programs, objects, components, data structures, etc., which perform particular tasks or implement data types. The module(s) 316 may also be implemented as, signal processor(s), state machine(s), logic circuitries, and/or any other device and/or component that manipulates signals based on operational instructions.

Further, the module(s) 316 may be implemented in hardware, instructions executed by a processing unit, or by a combination thereof. The processing unit may comprise a computer, a processor, such as the processor 302, a state machine, a logic array and/or any other suitable devices capable of processing instructions. The processing unit may be a general-purpose processor which executes instructions to cause the general-purpose processor to perform operations or, the processing unit may be dedicated to perform the functions. In another aspect of the present disclosure, the module(s) 316 may be machine-readable instructions (software) which, when executed by a processor/processing unit, may perform any of the described functionalities.

In an embodiment, the module(s) 316 may include the system 108. In an embodiment, the system 108 may be implemented as part of the processor 302. In an embodiment, the system 108 may be external to both the processor 302 and the module(s) 316. According to some example embodiments, operations described herein as being performed by any or all of the caller VR device 102, the callee VR device 104, the system 108, the server 114, the module(s) 200, the detecting unit 204, the parameter unit 206, the analyzing unit 208, the transferring unit 210, the call processing unit 212, the device 300, the communication interface unit 306, the camera unit(s) 312, the sensor unit(s), and the module(s) may be performed by at least one processor (e.g., the processor 302) executing program code that includes instructions (e.g., the module(s) 200, the module(s) 316 and/or the stitching algorithm 320) corresponding to the operations. The instructions may be stored in a memory (e.g., the memory 304).

In accordance with some example embodiments, the detecting unit 204 may detect a placement of a VR call from the caller VR device 102 to the callee VR device 104. In an embodiment, the system 108 may be implemented in the caller VR device 102. The VR call may be placed via a user-selectable option provided (e.g., displayed and/or output) on a user-interface corresponding to a native dialer of the caller VR device 102. The user-selectable option on the user-interface may be provided by the call processing unit 212, as described in FIG. 4 later. As such, a user of the caller VR device 102 may select a contact (e.g., the callee VR device 104) and/or select the user-selectable option to place the VR call to the contact. Consequently, the detecting unit 204 may detect the placement of the VR call.

In an embodiment, the system 108 may be implemented in the callee VR device 104. As such, the detecting unit 204 may detect the placement of the VR call when a request for VR call is received from the caller VR device 102 during a call set-up phase, in which a ringtone is not generated by the callee VR device 104 and a ring-back tone is not received by the caller VR device 102. The detecting unit 204 may detect the placement of the VR call using techniques as known in the art.

In an embodiment, the system 108 may be implemented in the server 114. As such, the detecting unit 204 may detect the placement of the VR call using techniques as known in the art.

In response to detecting the placement of the VR call, the parameter unit 206 may obtain first data pertaining to a plurality of parameters associated with the callee VR device 104. The plurality of parameters may include battery/power, network conditions, bandwidth, memory, location of a device, and/or support for stitching operation. For example, the first data may indicate an amount of memory space available within the memory 304 of the callee VR device 104; a processing speed of the processor 302 of the callee VR device 104; an amount of power available within the power unit (e.g., a remaining amount of power stored in a battery) of the callee VR device 104; bandwidth (e.g., an available amount of bandwidth) and network connections (e.g., a signal quality of the network connections, such as a downlink and/or uplink signal quality from a base station and/or access point serving the callee VR device 104) provided by the network unit of the callee VR device 104; availability of the stitching algorithm 320 in the memory 304 (e.g., whether the stitching algorithm 320 is stored in the memory 304) of the callee VR device 104; a location of the callee VR device 104 (e.g., provided by the sensor unit(s) 314); etc. Thus, the first data is indicative of device capabilities of the callee VR device 104.

The parameter unit 206 may obtain second data pertaining to the plurality of parameters associated with the caller VR device 102. For example, the second data may indicate an amount of memory space available within the memory 304 of the caller VR device 102; a processing speed of the processor 302 of the caller VR device 102; an amount of power available within the power unit (e.g., a remaining amount of power stored in a battery) of the caller VR device 102; bandwidth (e.g., an available amount of bandwidth) and network connections (e.g., a signal quality of the network connections, such as a downlink signal quality from a base station and/or access point serving the callee VR device 104) provided by the network unit of the caller VR device 102; whether the stitching algorithm 230 is available in the memory 304 (e.g., whether the stitching algorithm 320 is stored in the memory 304) of the caller VR device 102; a location of the caller VR device 102 (e.g., provided by the sensor unit(s) 314); etc. Thus, the second data is indicative of device capabilities of the caller VR device 102.

In an embodiment, the system 108 may be implemented in the caller VR device 102. The parameter unit 206 may obtain the first data from the callee VR device 104 and/or the network 106 (e.g., the server 114) during the call set-up phase using techniques as known in the art.

In an embodiment, the system 108 may be implemented in the callee VR device 104. The caller VR device 102 may send the second data to the callee VR device 104 along with the VR call request during the call set-up phase. The parameter unit 206 may then obtain the second data using techniques as known in the art.

In an embodiment, the system 108 may implemented in the server 114. The parameter unit 206 may obtain the first data from the callee VR device 104 and the second data from the caller VR device 102 during the call set-up phase using techniques as known in the art.

Upon (e.g., after) obtaining the first data and the second data, the analyzing unit 208 may analyze the first data and the second data to determine a capability to perform stitching operation associated with the VR call by at least one of the caller VR device 102 and the callee VR device 104. The transferring unit 210 may transfer the stitching operation associated with the VR call to one of the caller VR device 102 and/or the callee VR device based on the analysis of the first data and the second data.

To this end, the analyzing unit 208 may compare the first data and the second data. Based on the comparison, the transferring unit 210 may determine whether the callee VR device 104 is capable of performing the stitching operation or not. Based on the determination, the transferring unit 210 may transfer the stitching operation to one of the caller VR device 102 and/or the callee VR device 104.

In an embodiment, the comparison between the first data and the second data may indicate the callee VR device 104 does not have support for stitching operation, e.g., the stitching algorithm is not available (e.g., stored and/or installed) within the callee VR device 104, while the caller VR device 102 supports the stitching operation. The transferring unit 210 may determine the callee VR device 104 is not capable of performing the stitching operation. As such, the transferring unit 210 may not transfer the stitching operation to the callee VR device 104 and may transfer the stitching operation to the caller VR device 102.

In an embodiment, the comparison between the first data and the second data may indicate the callee VR device 104 has support for stitching operation, e.g., the stitching algorithm is available with the callee VR device 104, but the callee VR device 104 does not have enough resource(s) (e.g., the resource(s) 310) such as bandwidth, network condition, power, etc. to perform the stitching operation. In an embodiment, the comparison between the first data and the second data may indicate the callee VR device 104 has support for stitching operation, e.g., the stitching algorithm is available with the callee VR device 104, but the callee VR device 104 is at a location where saving resource(s) (e.g., the resource(s) 310) is a priority. The comparison may also indicate the caller VR device 102 supports the stitching operation. Accordingly, the transferring unit 210 may determine the callee VR device 104 is not capable of performing the stitching operation. As such, the transferring unit 210 may not transmit the stitching operation to the callee VR device 104. For example, the callee VR device 104 may be at an outdoor location where access to power sources is scarce and the caller VR device 102 may be at an indoor location with plenty of power sources around. In such situation, the transferring unit 210 may determine the callee VR device 104 is not capable of performing the stitching operation.

In an embodiment, the comparison between the first data and the second data may indicate the callee VR device 104 has support for stitching operation, e.g., the stitching algorithm is available with the callee VR device 104, and has enough resource(s) (e.g., the resource(s) 310) such as bandwidth, network condition, power, etc., to perform the stitching operation. The comparison may also indicate the caller VR device 102 supports the stitching operation. Accordingly, the call processing unit 212 may determine the callee VR device 104 is capable of performing the stitching operation. As such, the call processing unit 212 may transfer the stitching operation to the callee VR device 104.

As discussed above, performing VR content stitching involves high power consumption. However, mobile devices also use power resources for rendering VR image(s) and/or video(s). Accordingly, if a device with low power resources performs stitching operations, the device may be unable to render VR image(s) and/or video(s), or may render low-quality versions of the VR image(s) and/or video(s), after performing stitching operations. In conventional systems, a device is assigned to perform VR content stitching without consideration of respective capabilities (e.g., a remaining amount of power stored in a battery) of mobile devices engaged in a VR call. By failing to consider the capabilities of the mobile devices, the conventional systems fail to conserve resources for use in rendering VR image(s) and/or video(s), resulting in reduction of quality or failure to render the VR image(s) and/or video(s). However, according to some example embodiments one of the caller VR device 102 and/or the callee VR device 104 is selected to perform the stitching operation based on capabilities of the respective devices. Accordingly, the device most capable of performing the stitching operation (e.g., the device with the greater power resources and/or access to power resources) is selected to perform the stitching operation. Accordingly, resources among the caller VR device 102 and/or the callee VR device 104 are conserved, resulting in an improvement in quality and/or reliability of rendered VR image(s) and/or video(s). Thus, the capability discovery process employed by the system 108 by way of comparing data corresponding to the plurality of parameters associated with the caller VR device 102 and/or the callee VR device 104 enables optimizing or improving performance of resource(s) (e.g., battery and/or power resources) used for rendering the VR call. This leads to enhanced user-experience.

In an embodiment, transferring the stitching operation may comprise transmitting a stitching request to the callee VR device 104 and/or the caller VR device 102. The stitching request may be transmitted in the form of a Session Initiation Protocol (SIP) message. The stitching request may be transmitted during the call set-up phase by the transferring unit 210.

In addition, in an embodiment, the system 108 may be implemented in the caller VR device 102. In an embodiment, the system 108 may be implemented in the server 114. The system 108 may transmit the stitching request to the callee VR device 104. Upon receiving the stitching request, a notification may be provided on the callee VR device 104 informing a user of the callee VR device 104 regarding the transfer of the stitching operation to the callee VR device 104.

In an embodiment, the system 108 may be implemented in the callee VR device 104. Accordingly, the system 108 may provide a notification on the callee VR device 104 informing a user of the callee VR device 104 regarding the transfer of the stitching operation to the callee VR device 104.

Upon transmitting the stitching request, a response from the callee VR device 104 may be received by the call processing unit 212 in reply to the notification on the callee VR device 104. In an embodiment, the response may be received in the form of a SIP message. The response may be received during the call set-up phase. In an embodiment, the user of the callee VR device 104 may provide the response in reply to the notification. In an embodiment, the callee VR device 104 may provide the response in reply to the notification without intervention from the user of the callee VR device 104.

Further, in an embodiment, the response may be indicative of accepting the stitching request by the callee VR device 104. The call processing unit 212 may establish the VR call between the caller VR device 102 and the callee VR device 104 over the network 106. The establishment of the VR call may be based on techniques as known in the art. Subsequent to the establishment of the VR call, the call processing unit 212 may enable the transmission of the plurality of media contents 110 from the caller VR device 102 to the callee VR device 104 such that the callee VR device 104 may perform the stitching operation to stitch the plurality of media contents 110 as the stitched media content 112 for rendering during the VR call.

In an embodiment, the system 108 may be implemented in the caller VR device 102 and may receive the response from the callee VR device 104. The call processing unit 212 may direct the camera unit(s) 312 of the caller VR device 102 to capture the plurality of media contents 110 using techniques as known in the art. The call processing unit 212 may then transmit the captured plurality of media contents 110 to the callee VR device 104 over the network 106 such that the callee VR device 104 stitches (e.g., is caused to stitch) the plurality of media contents 110 as the stitched media content 112 for rendering during the VR call. The VR enabled display unit 308 may display a user-interface rendering the plurality of media contents 110 while and/or after the plurality of media contents 110 are captured.

In an embodiment, the system 108 may be implemented in the server 114 and may receive the response from the callee VR device 104. The call processing unit 212 may send a signal to the caller VR device 102 requesting and/or causing the caller VR device 102 to capture and/or transmit the plurality of media contents 110 to the callee VR device 104 in a manner as described above.

In an embodiment, the system 108 may be implemented in the callee VR device 104 and may send the response to the caller VR device 102. The caller VR device 102 may capture and/or transmit the plurality of media contents 110 to the callee VR device 104 upon receiving the response in a manner as described above.

In an embodiment, the response is indicative of rejecting the stitching request by the callee VR device 104. The call processing unit 212 may transfer the stitching request to the caller VR device 102 such that the stitching operation is performed on the caller VR device 102 to form the stitched media content 112 from the plurality of media contents 110. The call processing unit 212 may enable the transmission of the stitched media content 112 from the caller VR device 102 to the callee VR device 104 upon establishment of the VR call for rendering during the VR call.

In an embodiment, the system 108 may be implemented in the caller VR device 102 and may receive the response from the callee VR device 104. The call processing unit 212 may perform the stitching operation to form the stitched media content 112 from the plurality of media contents 110. The call processing unit 212 may perform the stitching operation using the stitching algorithm 230. The call processing unit 212 may then transmit the stitched media content 112 to the callee VR device 104 for rendering during the VR call.

In an embodiment, the system 108 may be implemented in the server 114 and may receive the response from the callee VR device 104. The call processing unit 212 may send a signal to the caller VR device 102 requesting and/or causing the caller VR device 102 to transmit the stitched media content 112 to the callee VR device 104. As such (e.g., in response to the signal), the caller VR device 102 may capture the plurality of media contents 110, perform the stitching operation to obtain the stitched media content 112 from the plurality of media contents 110, and transmit the stitched media content 112 to the callee VR device 104 in a manner as described above.

In an embodiment, the system 108 may be implemented in the callee VR device 104 and may send the response to the caller VR device 102. The caller VR device 102 may capture the plurality of media contents 110, perform the stitching operation to obtain the stitched media content 112 from the plurality of media contents 110, and transmit the stitched media content 112 to the callee VR device 104 upon (e.g., in response to) receiving the response.

Thus, offloading of the stitching operation by the caller VR device 102 to the callee VR device 104 based on negotiation between the caller VR device 102 and the callee VR device 104, by way of transmitting the stitching request and receiving the response, enables optimizing or improving performance of resource(s) (e.g., the resource(s) 310) used for rendering the VR call. This leads to enhanced user-experience.

Further, in an embodiment, the callee VR device 104 may not have support for stitching operation, e.g., the stitching algorithm may not be available with (e.g., not stored and/or installed in) the callee VR device 104. The transferring unit 210 may enable performing the stitching operation at the caller VR device 102 to form the stitched media content 112 from the plurality of media contents 110. The call processing unit 212 may then enable transmission of the stitched media content 112 from the caller VR device 102 to the callee VR device 104 upon establishment of the VR call for rendering during the VR call.

In an embodiment, the system 108 may be implemented in the caller VR device 102 and may determine the callee VR device 104 is not capable of performing the stitching operation while the caller VR device 102 is capable of performing the stitching operation. Accordingly, the call processing unit 212 may direct the camera unit(s) 312 of the caller VR device 102 to capture the plurality of media contents 110 using techniques as known in the art. The call processing unit 212 may perform the stitching operation to form the stitched media content 112 from the plurality of media contents 110. The call processing unit 212 may perform the stitching operation using the stitching algorithm 230. The call processing unit 212 may then transmit the stitched media content 112 to the callee VR device 104 for rendering during the VR call.

In an embodiment, the system 108 may be implemented in the server 114 and may determine the callee VR device 104 is not capable of performing the stitching operation while the caller VR device 102 is capable of performing the stitching operation. The call processing unit 212 may send a signal to the caller VR device 102 requesting and/or causing the caller VR device 102 to transmit the stitched media content 112 to the callee VR device 104. As such (e.g., in response to the signal), the caller VR device 102 may capture the plurality of media contents 110, perform the stitching operation to obtain the stitched media content 112 from the plurality of media contents 110, and transmit the stitched media content 112 to the callee VR device 104.

In an embodiment, the system 108 may be implemented in the callee VR device 104 and may determine the callee VR device 104 is not capable of performing the stitching operation while the caller VR device 102 is capable of performing the stitching operation. The call processing unit 212 may send a signal to the caller VR device 102 requesting and/or causing the caller VR device 102 to transmit the stitched media content 112 to the callee VR device 104. As such (e.g., in response to the signal), the caller VR device 102 may capture the plurality of media contents 110, perform the stitching operation to obtain the stitched media content 112 from the plurality of media contents 110, and transmit the stitched media content 112 to the callee VR device 104.

Further, during the VR call, the call processing unit 212 may receive a notification from the callee VR device 104. The notification may be indicative of a region of interest corresponding to one of the plurality of media contents 110 and/or the stitched media content 112. In an embodiment, the notification may be received in the form of SIP message. In an embodiment, the notification may be received in the form of a Real-Time Transport Protocol (RTP) Control Protocol (RTCP) extension. The notification may be displayed on the VR enabled display unit 308 in any form such as a text message, a pop-up message, etc., and may be overlaid on the user-interface displaying the plurality of media contents 110 and/or the stitched media content 112.

In response to the notification, the call processing unit 212 may identify a current view point of the caller VR device 102. The call processing unit 212 may adjust the current view point of the camera unit(s) 312 of the caller VR device 102 towards the region of interest (e.g., to establish an adjusted view point). The call processing unit 212 may enable transmission of at least one of a plurality of further (e.g., adjusted) media contents and/or a stitched further (e.g., adjusted) media content as viewed from the adjusted view point from the caller VR device 102 to the callee VR device 104 for rendering during the VR call.

In an embodiment, the system 108 may be implemented in the caller VR device 102 and may receive the notification from the callee VR device 104. The call processing unit 212 may identify a current view point of the camera unit(s) 312 of the caller VR device 102. The call processing unit 212 may adjust the current view point of the camera unit(s) 312 of the caller VR device 102 towards the region of interest. The view point of the camera unit(s) 312 may be adjusted using techniques as known in the art.

In an embodiment, the call processing unit 212 may be capturing the plurality of media contents 110 at an angle Al and transmitting the captured plurality of media contents 110 to the callee VR device 104. The callee VR device 104 may be stitching the plurality of media contents 110 as the stitched media content 112 during the VR call. The region of interest included in a notification received from the callee VR device 104 may indicate capturing of the media contents at angle A2. As such, the call processing unit 212 may capture a plurality of further media contents as viewed from the adjusted view point, e.g., at angle A2, and may transmit the captured plurality of further media contents to the callee VR device 104. The callee VR device 104 may then stitch the plurality of further media contents as further stitched media content for rendering during the VR call.

In an embodiment, the call processing unit 212 may be capturing the plurality of media contents 110 at an angle A1 and transmitting the stitched media content 112 during the VR call. The region of interest included in a notification received from the callee VR device 104 may indicate capturing of the media contents at angle A2. As such, the call processing unit 212 may capture a plurality of further media contents as viewed from the adjusted view point, e.g., at angle A2, and may stitch the captured plurality of further media contents to form further stitched media content. The call processing unit 212 may transmit the further stitched media content to the callee VR device 104 for rendering during the VR call.

Further, in an embodiment, the system 108 may be implemented in the server 114 and may receive the notification from the callee VR device 104. The call processing unit 212 may determine the current view point of the caller VR device 102 using techniques as known in the art. The call processing unit 212 may then send a signal to the caller VR device 102 to adjust the view point towards the region of interest included in a notification received from the callee VR device 104 and to transmit either a plurality of further media contents or stitched further media content as viewed from the adjusted view point to the callee VR device 104. As such, the caller VR device 102 may transmit either the plurality of further media contents or stitched further media content to the callee VR device 104, in a manner as described above.

In an embodiment, the system 108 may be implemented in the callee VR device 104 and may send the notification to the caller VR device 102. The caller VR device 102 may capture the plurality of further media contents, perform the stitching operation to obtain the stitched further media content from the plurality of further media contents, and transmit the stitched further media content to the callee VR device 104 upon receiving the notification.

As discussed above, conventional caller devices performing a VR call either transfer a live, complete 360-degree image and/or video to a conventional callee device or to an external server. The transfer of such a large amount of data involves excessive resource consumption (e.g., processor and/or power resources), resulting in a poorer user experience as fewer resources remain for performing image and/or video rendering and due to lengthy transfer delay. However, according to some example embodiments, on-demand 360-degree content may be viewed without having to share any details with an external server and/or without having to share entire content covering 360-degree angles. Specifically, the caller VR device 102 may transfer a portion of the 360-degree image(s) and/or video(s) according to a region of interest indicated by the callee VR device 104. This enhances the user-experience as fewer resources (e.g., processor and/or power resources) are consumed for sharing content but rather may be used for rendering of the content, and due to decreased transfer delay.

Further, in an embodiment the system 108 may be implemented in the callee VR device 104. Upon transmitting the response indicative of either accepting the stitching request or rejecting the stitching request, the call processing unit 212 may provide (e.g., cause display and/or output of) at least one VR call related option indicative of accepting the VR call on a user-interface (e.g., a user interface corresponding to a native call receiver). The at least one VR call related option on the user-interface may be provided by the call processing unit 212, as described in FIG. 5 later. The input device may receive a user-input indicative of selecting a VR call related option from the at least one VR call related option. Based on the selected VR call related option, the call processing unit 212 may establish the VR call with the caller VR device 102.

Further, during the VR call, the call processing unit 212 may detect a view-change event subsequent to rendering the stitched media content 112. The view-change event may be indicative of changing an angle and/or direction of the stitched media content 112 currently being rendered on the VR enabled display unit 308. In an embodiment, the view-change event may correspond to movement of the callee VR device 104 from a first position to a second position subsequent to rendering the stitched media content 112. In an example, the sensor unit(s) 314, such as the gyroscope, may capture an event indicative of movement of the callee VR device 104 from the first position to the second position subsequent to rendering the stitched media content 112. In such an example, the call processing unit 212 may detect the movement of the callee VR device 104 as view-change event.

In an embodiment, the view-change event may correspond to eye gaze movement. In an example, the sensor unit(s) 314, such as the eye-tracing sensor may capture an eye gaze in a particular direction and/or angle. In such an example, the call processing unit 212 may detect the eye gaze (e.g., a change in eye gaze from a first direction and/or angle to a second direction and/or angle) as view-change event.

In an embodiment, the view-change event may correspond to reception of a defined gesture input. In an example, the sensor unit(s) 314, such as the gesture sensor, may capture the gesture input. In such an example, the call processing unit 212 may determine if the received gesture input is defined in the memory 304. Examples of such defined gesture input may include, but are not limited to, pinch out, swipe horizontal, swipe vertical, and/or return. Upon positive determination (e.g., a determination that the received gesture input is defined in the memory 304), the call processing unit 212 determines the received gesture input indicates the view-change event.

In an embodiment, the view-change event may correspond to reception of a defined audio input. In an example, the sensor unit(s) 314, such as the audio module, may capture the audio input. In such an example, the call processing unit 212 may determine if the received audio input is defined in the memory 304. Examples of such defined audio input may include, but are not limited to, defined phrase and defined voice pattern. Upon positive determination (e.g., a determination that the received audio input is defined in the memory 304), the call processing unit 212 may determine the received audio input indicates the view-change event.

Based on determining and/or detecting the view-change event, the call processing unit 212 may determine a region of interest corresponding to media content from the stitched media content 112. The region of interest may indicate a desired angle and/or direction for viewing the stitched media content 112 (e.g., an angle and/or direction corresponding to the new view). Upon determining the region of interest, the call processing unit 212 may send the notification to the caller VR device 102 during the VR call, as described above.

Further, as described above, in response to the notification, in an embodiment, the caller VR device 102 may transmit a plurality of further media contents corresponding to the region of interest. The call processing unit 212 may perform the stitching operation using the stitching algorithm 320 to form further stitched media content from the plurality of further media contents. The call processing unit 212 may then render the further stitched media during the VR call on the VR enabled display unit 308. In an embodiment, the caller VR device 102 may transmit the further stitched media (e.g., to the callee VR device 104). The call processing unit 212 may then render the further stitched media during the VR call on the VR enabled display unit 308.

In an embodiment, the system 108 may be implemented in the caller VR device 102. In an embodiment, the system 108 may be implemented in the server 114. The above-mentioned functions of the call processing unit 212 such as detecting the view-change event, detecting the region of interest, and sending notification may be performed by any suitable component of the callee VR device 104 (e.g., the processor 302).

Further, as would be understood, use of adaptive streaming formats for delivering 360-degree videos to VR devices with content adaptation and/or selection is affected by various factors such as network conditions, device capabilities, and field of view.

The present disclosure enables offloading of the stitching operation to callee VR device based on current capabilities of the callee VR device. This enhances the user-experience as resources are not consumed for sharing content but rather for rendering of the content. Further, the present disclosure enables use of standard techniques such as the SIP INFO and the RTCP extension for sharing field of view information with the caller VR device. This further enhances the user-experience as on-demand 360-degree video may be easily shared without sharing entire content and leads to improvement in the network bandwidth.

FIG. 4 illustrates an example user interface 400 provided by the caller VR device 102 for establishing the VR call, in accordance with some example embodiments of the inventive concepts. In some example embodiments, the system 108 may be implemented in the caller VR device 102. As described above, the user interface 400 may correspond to a native dialer for placing calls to various contacts. The call processing unit 212 may determine a number of the camera unit(s) 312 and/or a type of camera unit(s) 312 (e.g., of the caller VR device 102 and/or callee VR device 104). The call processing unit 212 may also obtain the second data indicative of device capabilities of the caller VR device 102. As described above, the second data may indicate memory space available with the memory 304; processing speed of the processor 302; power available within the power unit; bandwidth and/or network connections provided by the network unit; whether the stitching algorithm 320 is available in the memory 304; location of the caller VR device 102 (e.g., provided by the sensor unit(s) 314); etc.

Based on the number of the camera unit(s) 312, the type of camera unit(s) 312, and the device capabilities of the caller VR device 102, the call processing unit 212 may provide a user-selectable option 402 to make a VR call. The call processing unit 212 may provide the user-selectable option 402 in addition to a user-selectable option 404 to make voice call and/or a user-selectable option 406 to make video call. In an example, the number of camera unit(s) 312 may be 2, the type of each of the camera unit(s) 312 may be a 360-degree camera, and the device capability may indicate availability of the stitching algorithm 320. In such an example, the call processing unit 212 may provide the user-selectable option 402 (e.g., cause the user-selectable option 402 to be displayed on the user interface 400).

FIG. 5 illustrates an example user interface 500 provided by the callee VR device 104 for establishing the VR call, in accordance with some example embodiments of the instant application. In some example embodiments, the system 108 may be implemented in the callee VR device 104. As described above, the user-interface 500 may correspond to a native call receiver. The call processing unit 212 may determine a number of the camera unit(s) 312 and/or a type of camera unit(s) 312 (e.g., of the caller VR device 102 and/or callee VR device 104). The call processing unit 212 may also obtain the first data indicative of device capabilities of the callee VR device 104. As described above, the first data may indicate memory space available with the memory 304; processing speed of the processor 302; power available within the power unit; bandwidth and/or network connections provided by the network unit; whether the stitching algorithm 320 available in the memory 304; location of the callee VR device 104 (e.g., provided by the sensor unit(s) 314); etc.

During the call set-up phase, the call processing unit 212 may obtain information about type of the caller VR device 102. Based on the number of the camera unit(s) 312, type of camera unit(s) 312, the device capabilities of the callee VR device 104, and/or the type of the caller VR device 102, the call processing unit 212 may provide at least one of a first VR call related option 502 and/or a second VR call related option 504 to accept a VR call. The first VR call related option 502 may indicate a one-way VR call, e.g., only receive or render the stitched media content 112 (e.g., without transmitting media contents). The second VR call related option 504 may indicate a two-way VR call, e.g., receive or render the stitched media content 112 and transmit media contents. The call processing unit 212 may provide (e.g., cause to be displayed on the user interface 400) the first VR call related option 502 and the second VR call related option 504 in addition to a user-selectable option 506 to accept a voice call, a user-selectable option 508 to accept a video call, and/or a user-selectable option 510 to reject the call.

In an example, the number of camera unit(s) 312 may be 2, type of each of the camera unit(s) 312 may be a three-dimensional (3D) camera, and device capability may indicate availability of the stitching algorithm 320. Further, the caller VR device 102 may be a standalone VR device and the callee VR device 104 may be either a standalone VR device or comprise a smartphone mounted in a HMD. In such an example, the call processing unit 212 may provide the first VR call related option 502.

In an example, the number of camera unit(s) 312 may be 2, type of each of the camera unit(s) 312 may be external 360-degree camera, and device capability may indicate availability of the stitching algorithm 320. Further, both the caller VR device and the callee VR device 104 may comprise a smartphone mounted in a HMD. In such an example, the call processing unit 212 may provide the second VR call related option 504.

Figure 6:
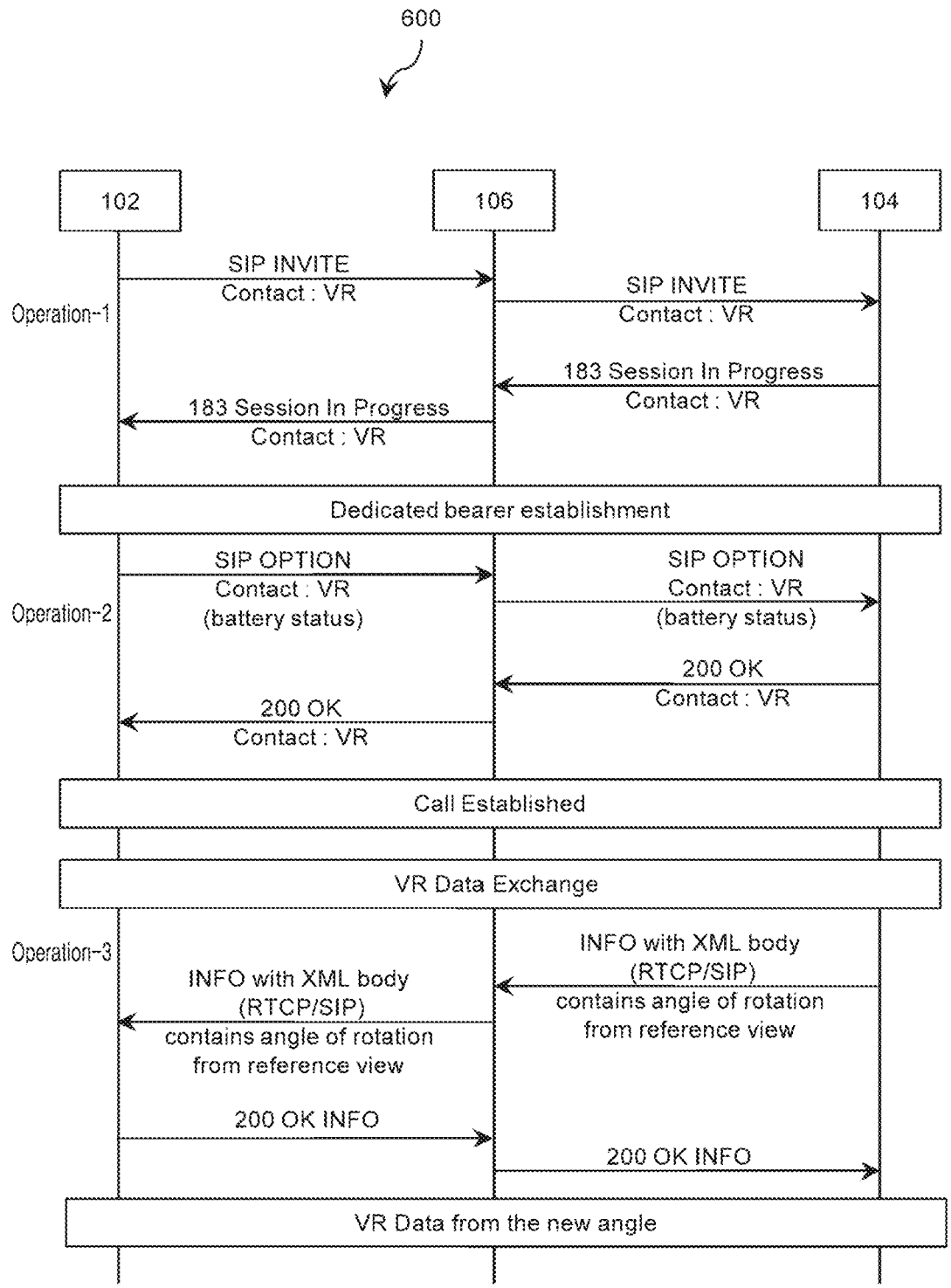
FIG. 6 illustrates an example data flow indicating an exchange of instructions between the caller VR device and the callee VR device for establishing the VR call, in accordance with some example embodiments of the inventive concepts.

FIG. 6 illustrates an example data flow 600 indicating an exchange of instructions between the caller VR device 102 and the callee VR device 104 for establishing the VR call, in accordance with some example embodiments of the inventive concepts. In the example data flow, the instructions for establishing a connection are exchanged using SIP messaging whereas the notification is exchanged using one of SIP messaging and RTCP extensions.

At operation 1, a SIP INVITE request may be sent from the caller VR device 102 to the callee VR device 104 over the network 106. As would be understood, the SIP INVITE request is the message sent by a caller party, inviting a callee party for a session. A SIP RESPONSE, e.g., Session in Progress, may sent by the callee VR device 104 to the caller VR device 102 over the network 106 in response to the SIP INVITE request. As would be understood, the Session in Progress response (depicted as "183 Session in Progress") allows for regional ring-back tone generation and carrier announcements at the caller party. In response to the Session in Progress response, a dedicated bearer channel may be established.

At operation 2, SIP OPTION and corresponding 200 OK messages may be exchanged over the network 106 between the caller VR device 102 and the callee VR device 104. During this operation, the stitching request and the response may also be exchanged between the caller VR device 102 and the callee VR device 104 in a manner as described above. For example, a battery and/or power status of the caller VR device 102 may be compared with a battery and/or power status of the callee VR device 104 and the stitching request may be sent to the callee VR device 104 (e.g., based on the comparison). Based on acceptance of the stitching request, the response may be sent to the caller VR device 102.

Thereafter, a call may be established and VR data, e.g., the plurality of media contents 110 and/or the stitched media content 112 may be exchanged between the caller VR device 102 and the callee VR device 104 over the network 106.

At operation 3, in an embodiment, the callee VR device 104 may transmit a region of interest, e.g., a desired direction and/or angle, using a SIP INFO eXtensible Markup Language (XML) body. In an example, the region of interest may be an angle of rotation from a reference view. In an embodiment, the callee VR device 104 may transmit the region of interest using an RTCP Extension. The RTCP Extension may be in below frame format.

| 7 | 6 | 5 | 4 | 3 | 2 | 1 | 0 |
|---|---|---|---|---|---|---|---|
| Direction and Angle | | | | CAM | | ROT | |

The fourth bit 'CAM' indicates which camera unit is currently rendering the stitched media content 112 such as rear camera (indicated by bit 1 in the 'CAM') or front camera (indicated by bit 0 in the 'CAM'). Based on the received XML message, the caller VR device 102 may receive the direction and/or angle, which will be displayed on the caller VR device 102. The caller VR device 102 may send a corresponding acceptance message, such as 200 OK INFO. Thereafter, the caller VR device 102 may send a plurality of media contents and/or stitched media content corresponding to the direction and/or angle.

Figure 7:
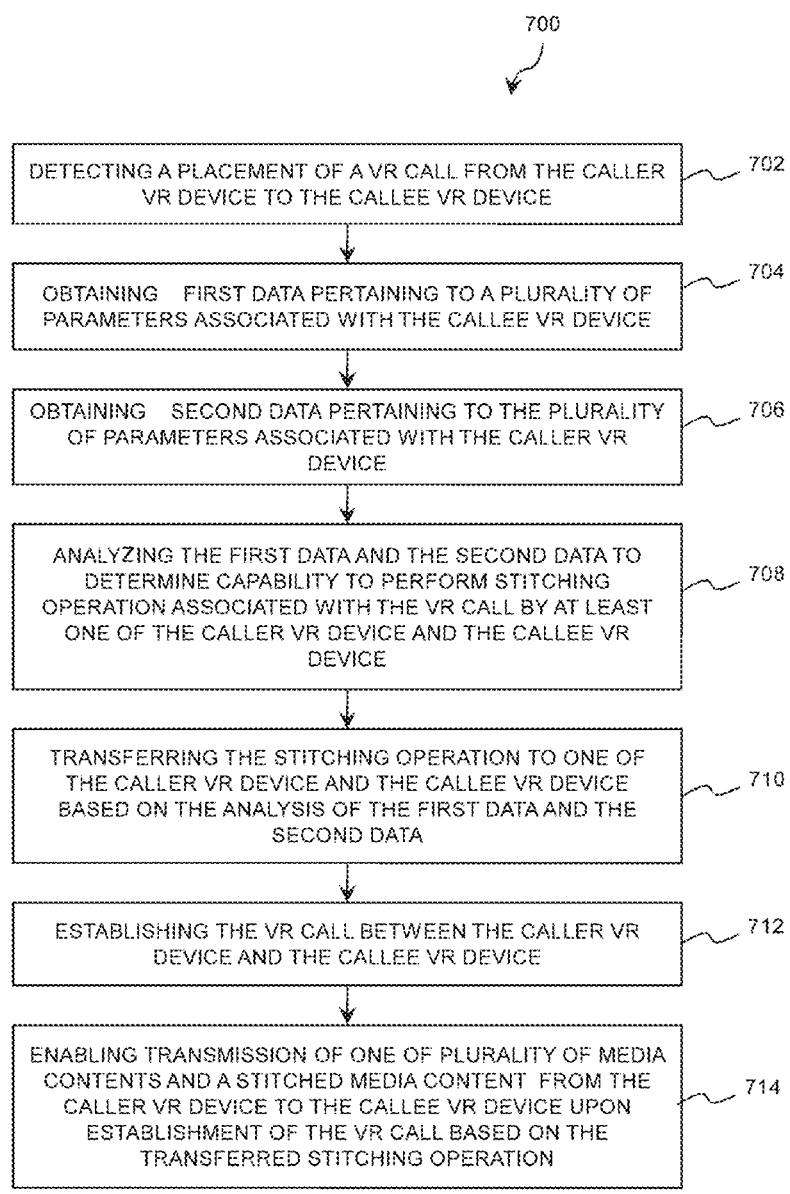
FIG. 7 illustrates a flow diagram of a method for establishing the VR call between the caller VR device and the caller VR device, in accordance with some example embodiments of the inventive concepts.

FIG. 7 illustrates a flow diagram of a method 700 for establishing a virtual reality (VR) call between a caller VR device and a callee VR device, in accordance with some example embodiments of the inventive concepts. The method 700 may be implemented by the system 108 using components thereof, as described above. In an embodiment, the method 700 may be executed by the detecting unit 204, the parameter unit 206, the analyzing unit 208, the transferring unit 210, and/or the call processing unit 212. Further, the system 108 may be implemented in any or all of the caller VR device 102, the callee VR device 104, and/or the server 114. Further, for the sake of brevity, details of the present disclosure that are explained in details in the description of FIGS. 1 to 6 are not explained in detail in the description of FIG. 7.

At block 702, the method 700 includes detecting a placement of a VR call from the caller VR device to the callee VR device. For example, the detecting unit 204 may detect the placement of the VR call between the caller VR device 102 and the callee VR device 104.

At block 704, the method 700 includes obtaining first data pertaining to a plurality of parameters associated with the callee VR device. The plurality of parameters may include one or more of battery, network conditions, bandwidth, memory, location of a device, and/or support for stitching operation. For example, the parameter unit 206 may obtain the first data pertaining to the plurality of parameters associated with the callee VR device 104.

At block 706, the method 700 includes obtaining second data pertaining to the plurality of parameters associated with the caller VR device. For example, the parameter unit 206 obtains second data pertaining to the plurality of parameters associated with the caller VR device 102.

At block 708, the method 700 includes analyzing the first data and the second data to determine a capability to perform stitching operation associated with the VR call by at least one of the caller VR device and/or the callee VR device. For example, the analyzing unit 208 may analyze the first data and the second data.

At block 710, the method 700 includes transferring the stitching operation associated with the VR call to one of the caller VR device and/or the callee VR device based on the analysis of the first data and the second data.

At block 712, the method 700 includes establishing the VR call between the caller VR device 102 and the callee VR device 104. For example, the call processing unit 212 may establish the VR call.

At block 714, the method 700 includes enabling transmission of one of a plurality of media contents and/or a stitched media content from the caller VR device to the callee VR device upon establishment of the VR call based on the transferred stitching operation. For example, the call processing unit 212 may capture and/or transmit the plurality of media contents 110 or the stitched media content 112 to the callee VR device 104 upon establishment of the VR call.

Further, in an embodiment, the callee VR device may be determined to be capable of performing stitching operation associated with the VR call based on the analysis. The operation of transferring the stitching operation at block 710 comprises transmitting a stitching request to the callee VR device. The stitching request may be transmitted in the form of a SIP message.

Accordingly, in an embodiment, the method 700 may include receiving a response indicative of accepting the stitching request from the callee VR device. The method 700 may include enabling the transmission of the plurality of media contents from the caller VR device to the callee VR device upon establishment of the VR call such that the callee VR device performs the stitching operation to stitch the plurality of media contents for rendering during the VR call.

Further, in an embodiment, the method 700 may include receiving a response indicative of rejecting the stitching request from the callee VR device. The method 700 may include transferring the stitching request to the caller VR device. The stitching operation may be performed on the caller VR device to form the stitched media content from the plurality of media contents. The method 700 may include enabling transmission of the stitched media content to the callee VR device upon establishment of the VR call for rendering during the VR call. For example, the call processing unit 212 may establish the VR call and transmit the stitched media content 112 to the callee VR device 104 upon receiving the response indicative of rejecting the stitching request.

Further, in an embodiment, the caller VR device may be determined to be capable of performing the stitching operation associated with the VR call based on the analysis. Transferring the stitching operation may comprise enabling the stitching operation to be performed at the caller VR device to form the stitched media content from the plurality of media contents. Accordingly, the method may include enabling transmission of the stitched media content from the caller VR device to the callee VR device upon establishment of the VR call for rendering during the VR call.

Further, in an embodiment, the method 700 may include receiving a notification from the callee VR device during the VR call. The notification may be indicative of a region of interest corresponding to one of the plurality of media contents and/or the stitched media content. The notification may be received in the form of one of: (a) SIP messaging and (b) RTCP extension. For example, the call processing unit 212 may receive the notification.

The method 700 may include identifying a current view point of the caller VR device. The method 700 may include adjusting the current view point of the caller VR device towards the region of interest. The method 700 may include enabling a transmission of one of a plurality of further media contents and/or a stitched further media content as viewed from the adjusted view point from the caller VR device to the callee VR device for rendering during the VR call. For example, the call processing unit 212 may adjust a current view of the caller VR device 102 towards the region of interest and transmit a plurality of further media contents as viewed from the adjusted view point to the callee VR device 104.

Thus, the present disclosure enables offloading of the stitching process based on capability discover process. This enables optimizing or improving performance of resource(s) used for rendering the VR call. This leads to enhanced user-experience.

While specific language has been used to describe the present disclosure, any limitations arising on account thereto, are not intended. As would be apparent to a person in the art, various working modifications may be made to the method in order to implement the inventive concepts as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. Clearly, the present disclosure may be otherwise variously embodied, and practiced within the scope of the following claims.

We claim:

1. A method for establishing a virtual reality (VR) call between a caller VR device and callee VR device, the method comprising:
   determining which of the caller VR device or the callee VR device should perform a stitching operation associated with the VR call based on a first plurality of parameters associated with the callee VR device and a second plurality of parameters associated with the caller VR device; and
   causing transmission of one of a plurality of media contents or a stitched media content from the caller VR device to the callee VR device after establishment of the VR call based on the determining,
   wherein each of the first plurality of parameters and the second plurality of parameters includes one or more of a remaining amount of power stored in a battery, a communication link signal quality, an available amount of bandwidth, an amount of available memory, a processing speed of a processor, a device location, or an indication of whether the stitching operation is supported.

2. The method as claimed in claim 1, wherein the determining determines that the callee VR device should perform the stitching operation.

3. The method as claimed in claim 2, further comprising: transmitting a stitching request to the callee VR device.

4. The method as claimed in claim 3, wherein the stitching request is transmitted via Session Initiation Protocol (SIP) messaging.

5. The method as claimed in claim 3, further comprising:
   receiving a response indicative of acceptance of the stitching request from the callee VR device,
   wherein the causing transmission causes transmission of the plurality of media contents such that the callee VR device is caused to perform the stitching operation, the stitching operation including stitching the plurality of media contents to form the stitched media content for rendering during the VR call.

6. The method as claimed in claim 3, further comprising:
   receiving a response indicative of rejection of the stitching request from the callee VR device, and causing the caller VR device to perform the stitching operation, the stitching operation including stitching the plurality of media contents to form the stitched media content, wherein the causing transmission causes transmission of the stitched media content for rendering during the VR call.

7. The method as claimed in claim 1, wherein the determining determines the caller VR device should perform the stitching operation.

8. The method as claimed in claim 7, further comprising: causing the caller VR device to perform the stitching operation, the stitching operation including stitching the plurality of media contents to form the stitched media content.

9. The method as claimed in claim 8, wherein the causing transmission causes transmission of the stitched media content for rendering during the VR call.

10. The method as claimed in claim 1, further comprising:
receiving a notification from the callee VR device during the VR call, the notification indicative of a region of interest corresponding to one of the plurality of media contents or the stitched media content;
identifying a current view point of the caller VR device;
adjusting the current view point of the caller VR device towards the region of interest to establish an adjusted view point; and
causing transmission of one of a plurality of adjusted media contents or a stitched adjusted media content as viewed from the adjusted view point for rendering during the VR call.

11. The method as claimed in claim 10, wherein the notification is received via one of SIP messaging or a Real-Time Transport Protocol (RTP) Control Protocol (RTCP) extension.

12. The method as claimed in claim 10, wherein the notification is received from the callee VR device subsequent to detection of a view-change event at the callee VR device during the VR call, the view-change event corresponding to one of:
movement of the callee VR device from a first position to a second position during the VR call,
eye gaze movement,
reception of a defined gesture input, or
reception of a defined audio input.

13. The method as claimed in claim 1, wherein the determining, and the causing transmission is performed by at least one of the caller VR device, the callee VR device, or a server.

14. An apparatus for establishing a virtual reality (VR) call between a caller VR device and a callee VR device comprising:
at least one processor configured to execute computer readable instructions to,
determine which of the caller VR device and the callee VR device should perform a stitching operation associated with the VR call based on a first plurality of parameters associated with the callee VR device and a second plurality of parameters associated with the caller VR device, and
cause transmission of one of a plurality of media contents or a stitched media content from the caller VR device to the callee VR device after establishment of the VR call based on the determination, wherein each of the first plurality of parameters and the second plurality of parameters includes one or more of a remaining amount of power stored in a battery, a communication link signal quality, an available amount of bandwidth, an amount of available memory, a processing speed of a processor, a device location, or an indication of whether the stitching operation is supported.

15. The apparatus as claimed in claim 14, wherein the at least one processor is configured to execute computer readable instructions to determine the callee VR device should perform the stitching operation associated with the VR call based on the first plurality of parameters associated with the callee VR device and the second plurality of parameters associated with the caller VR device.

16. The apparatus as claimed in claim 15, wherein the at least one processor is configured to execute computer readable instructions to:
receive a response indicative of acceptance of a stitching request from the callee VR device; and
cause transmission of the plurality of media contents from the caller VR device to the callee VR device such that the callee VR device is caused to perform the stitching operation, the stitching operation including stitching the plurality of media contents to form the stitched media content for rendering during the VR call.

17. The apparatus as claimed in claim 15, wherein the at least one processor is configured to execute computer readable instructions to:
receive a response indicative of rejection of a stitching request from the callee VR device;
cause the caller VR device to perform the stitching operation, the stitching operation including stitching the plurality of media contents to form the stitched media content; and
cause transmission of the stitched media content from the caller VR device to the callee VR device for rendering during the VR call.

18. The apparatus as claimed in claim 14, wherein the at least one processor is configured to execute computer readable instructions to determine the caller VR device should perform the stitching operation associated with the VR call based on the first plurality of parameters associated with the callee VR device and the second plurality of parameters associated with the caller VR device.

19. The apparatus as claimed in claim 14, wherein the at least one processor is configured to execute computer readable instructions to,
receive a notification from the callee VR device during the VR call, the notification indicative of a region of interest corresponding to one of the plurality of media contents or the stitched media content,
identify a current view point of the caller VR device,
adjust the current view point of the caller VR device towards the region of interest to establish an adjusted view point, and
cause transmission of one a plurality of adjusted media contents or a stitched adjusted media content as viewed from the adjusted view point from the caller VR device to the callee VR device for rendering during the VR call.

* * * * *